United States Patent
Kumar et al.

(10) Patent No.: US 10,133,396 B2
(45) Date of Patent: Nov. 20, 2018

(54) VIRTUAL INPUT DEVICE USING SECOND TOUCH-ENABLED DISPLAY

(71) Applicant: Intel Corporation, Santa Clara, CA (US)

(72) Inventors: Arvind Kumar, Beaverton, OR (US); John J. Valavi, Hillsboro, OR (US); Murali Ramadoss, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 15/063,216

(22) Filed: Mar. 7, 2016

(65) Prior Publication Data

US 2017/0255320 A1 Sep. 7, 2017

(51) Int. Cl.
*G06F 3/02* (2006.01)
*G09G 5/00* (2006.01)
*G06F 3/041* (2006.01)
*G06F 1/16* (2006.01)
*G06F 3/0488* (2013.01)

(52) U.S. Cl.
CPC .......... *G06F 3/0416* (2013.01); *G06F 1/1616* (2013.01); *G06F 1/1647* (2013.01); *G06F 1/1692* (2013.01); *G06F 3/0412* (2013.01); *G06F 3/04883* (2013.01); *G06F 3/04886* (2013.01)

(58) Field of Classification Search
CPC .... G06F 1/1647; G06F 3/0412; G06F 3/0416; G06F 3/04883; G06F 3/04886
See application file for complete search history.

(56) References Cited

U.S. PATENT DOCUMENTS

| | | | |
|---|---|---|---|
| 2011/0285631 A1* | 11/2011 | Imamura | G06F 1/1616 345/168 |
| 2012/0050187 A1 | 3/2012 | Chen | |
| 2012/0260207 A1 | 10/2012 | Treskunov et al. | |
| 2013/0127729 A1 | 5/2013 | Mosby et al. | |
| 2013/0257732 A1 | 10/2013 | Duffield | |
| 2016/0370988 A1* | 12/2016 | Bae | G06F 1/3206 |
| 2016/0371046 A1* | 12/2016 | Komiyama | G06F 3/1423 |

OTHER PUBLICATIONS

Xiong et al., "Physical Uplink Control Channel Formats for 5G", U.S. Appl. No. 62/299,458, filed Feb. 24, 2016, not published yet, 29 pages.
Intel Corporation, "Physical Uplink Control Channel Formats for 5G", PCT Application No. PCT/US16/30726, filed on May 4, 2016, not published yet, 53 pages.
PCT International Search Report, PCT Application No. PCT/US2017/015033, dated May 12, 2017, 3 pages.

\* cited by examiner

*Primary Examiner* — Insa Sadio
(74) *Attorney, Agent, or Firm* — International IP Law Group, P.L.L.C.

(57) ABSTRACT

An example system for generating hardware device input includes a gesture detector to detect an input device trigger from one of two coupled touch-enabled displays. The example system also further includes a redirector to intercept touch data from a triggered touch-enabled display. The example system further includes an emulator to generate hardware input data based on the intercepted touch data and send the hardware input data to an operating system. The example system also includes a user interface to display a virtual input device on the triggered touch-enabled display and receive touch data via the virtual input device.

21 Claims, 10 Drawing Sheets

US 10,133,396 B2

VIRTUAL INPUT DEVICE USING SECOND TOUCH-ENABLED DISPLAY

BACKGROUND ART

Many mobile devices such as laptops and mobile phones include touch-enabled displays that enable a user to input data using a finger or stylus. In some examples, two touch-enabled displays can be combined to use one touch-enabled display as a virtual input device. For example, the virtual input device can be a virtual keyboard or a virtual touchpad, corresponding to hardware input devices such as keyboard and touchpad among other hardware input devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for generating and receiving input from a virtual input device displayed on a display of one of two coupled touch-enabled displays. As the phrase is used herein, a virtual input device is a graphical user interface that mimics the appearance and functionality of a physical input device, such as a keyboard, touchpad or mouse. Specifically, the techniques described herein include a computer-readable medium, method and system for generating and receiving input from a virtual input device displayed on a second touch-enabled display. The techniques include disabling a display of the second touch-enabled display at an operating system (OS) during the display of the virtual input device. As discussed above, some laptops currently use two touch-enabled displays to form laptop designs. In some examples, one touch-enabled display can be used as a virtual keyboard. For example, OS soft keyboards can be used to provide a virtual keyboard interface for entering keyboard data. Likewise, OS-based touchpads can also be used.

However, OS-based soft keyboards and touchpads may not provide user-friendly experiences. For example, an operating system keyboard may appear on the bottom portion of the screen where a touch happens. Thus, if a user interacts with content appearing on a top screen, the OS-based keyboard may appear on the top screen and cover almost half of the content on the screen, while the bottom screen is left unused. In some examples, one or more windows may be hidden behind the OS-based soft keyboard or applications may show up on the same screen as the OS-based soft keyboard, making the OS-based soft keyboard difficult to use. Moreover, using an OS-based soft keyboard may take away focus from applications if the OS-based soft keyboard is created as another application window. The techniques described herein enable a hardware input device experience on a second touch-enabled display. Thus, a user can use the second touch-enabled display in place of a hardware keyboard, touchpad, or other input device.

Figure 1:
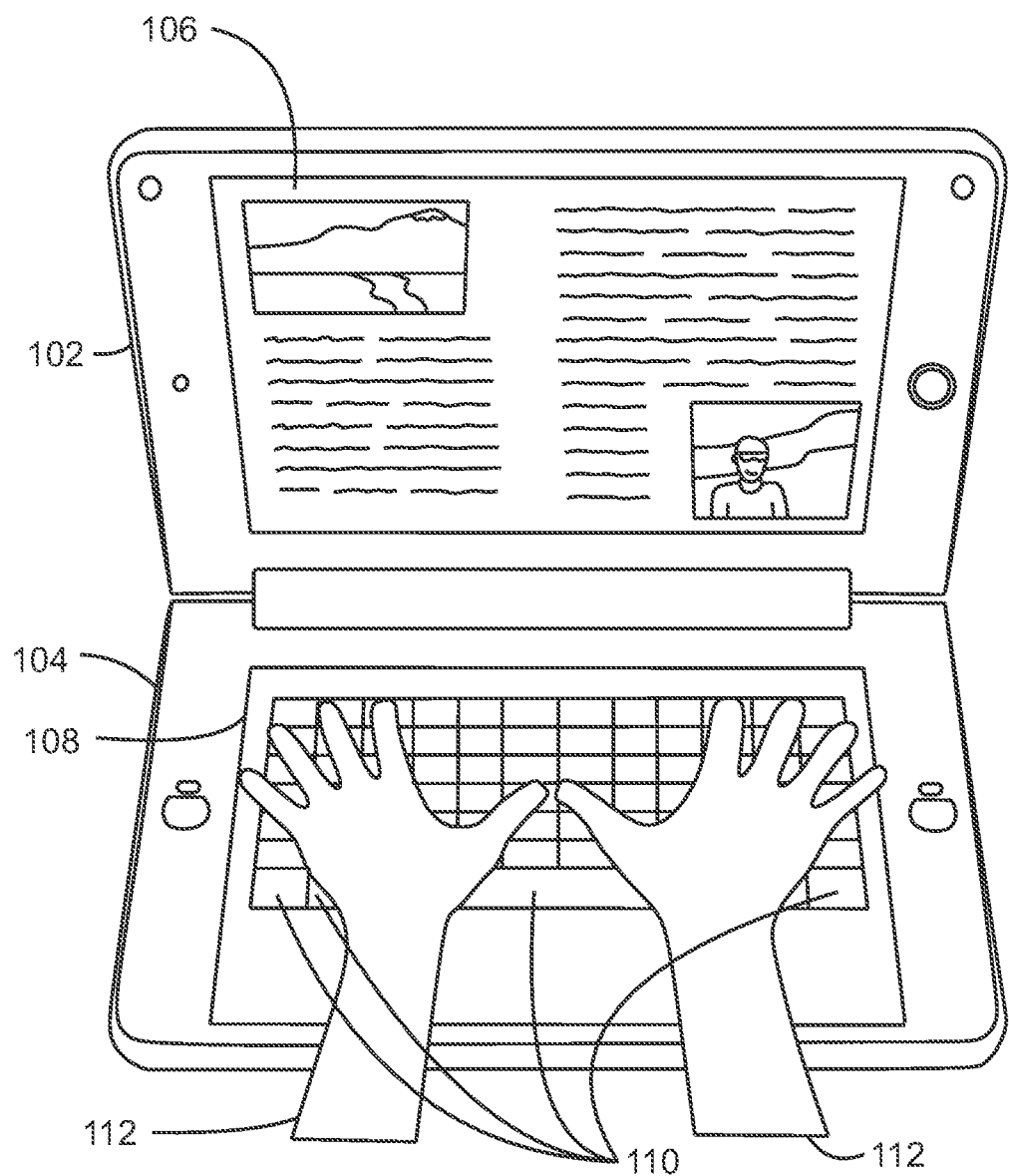
FIG. 1 is a diagram illustrating and example mobile computing device that can display a virtual input device at a second touch-enabled display and generate hardware input.

Referring now to FIG. 1, illustrates an example mobile computing device that can display a virtual input device at a second touch-enabled display and generate hardware input. The example mobile computing device is generally referred to by the reference number 100.

The mobile computing device 100 shown in FIG. 1 includes a first touch-enabled display 102 coupled to a second touch-enabled display 104. The first touch-enabled display has a first display 106. For example, the first display 106 is shown displaying a web page with writing and pictures. The second touch-enabled display 104 includes a second display 108. The second display 108 includes a virtual keyboard 110. A pair of hands 112 are shown in contact with the surface of the second touch-enabled display 104.

In some examples, the mobile computing device 100 may have a number of modes for displaying content on the two touch-enabled displays 102, 104. For example, the mobile computing device 100 may change display configurations based on the orientation of the mobile computing device 100.

In FIG. 1, the mobile computing device 100 is shown in a keyboard orientation with two hands 112 contacting the second display 108 of the second touch-enabled display 104. In some examples, a virtual input device 110 can be displayed on the second touch-enabled display 104 in response to detecting a trigger at the second touch-enabled display 104. For example, the trigger can be a gesture or the placement of one or more hands on the surface of the touch-enabled display 104. In some examples, the trigger can be a button press on the screen of a touch-enabled display or a physical button (not shown).

Figure 2:
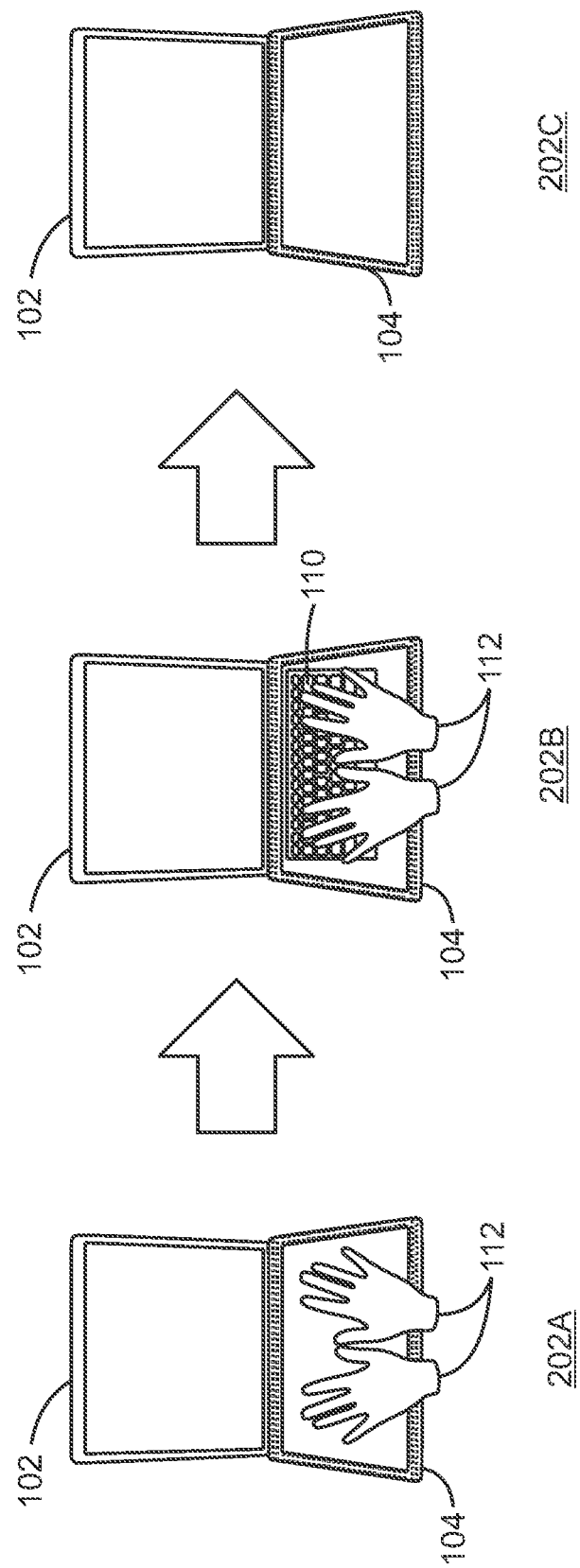
FIG. 2 is a schematic diagram illustrating a basic process for generating a virtual input device on a second touch-enabled display.

FIG. 2 is a diagram illustrating a basic process for generating a virtual input device on a second touch-enabled display. The example process is referred to generally by the reference number 200 and the example stages are referred to generally by the reference numbers 202A, 202B, 202C and can be implemented using the mobile computing device 100 of FIG. 1 above.

The first stage 202A shows a mobile computing device with a first touch-enabled display 102 and a second touch-enabled display 104. A pair of hands 112 are shown touching the touch-enabled display 104. In some examples, the touching of the touch-enabled display 104 can be detected and the display from the operating system can be disabled and an input device displayed as shown in the second stage 202B.

At the second stage 202B, the touch-enabled display 104 is shown displaying a virtual input device 110. In some examples, the virtual input device 110 can include a keyboard, a touchpad, or any other input device. For example, the touch-enabled display 104 may have had any display moved to the touch-enabled display 102 and had its display replaced with the virtual input device 110. In some examples, the touch-enabled display 104 can display the virtual input device 110 in response to the hands 112 being detected on the touch-enabled display 104. For example, the palms of the hands 112 may be detected at the touch-enabled display 104. In some examples, the detection of the hands 112 may be one of any number of possible triggers that can be used to enable the virtual input device 110. In some examples, an application can be used to manage the touch-enabled display 104 while it displays the virtual input device 110. As described in detail below, the virtual input device 110 can be a pseudo-device that emulates a hardware input device. Thus, the operating system of the mobile computing device may detect the loss of one display and an addition of a hardware input device. For example, the emulated hardware input device can be a keyboard with an integrated mouse and/or touchpad.

At the third stage, the touch-enabled display 104 no longer displays the virtual input device 110. For example, the hands 112 may no longer be detected at the touch-enabled display 104 and the virtual input device 110 may have been disabled as described below with respect to at least FIGS. 6 and 8. In some examples, the virtual input device 110 can be disabled upon detecting that the trigger is no longer present. In some examples, a second trigger can be used to disable the virtual input device 110. For example, a gesture or button on the touch-enabled display 104 can be used to disable the virtual input device 110. In some examples, the display can be restored on the touch-enabled display 104.

Thus, the touch-enabled display 104 can be temporarily removed from the operating system as a display and used instead as a virtual input device. For example, the operating system may detect a connected hardware device corresponding to the virtual input device. When the touch-enabled display 104 returns to a normal state as shown in stage 202C, the touch-enabled display 104 appears to the operating system as a second touch enabled display and can be used by the operating system as normal. As the phrase is used herein, a touch enabled display is a graphical user interface that is used primarily to display content to a user, but which also can receive touch input from a user through graphical input devices such as buttons, links, and the like. Examples of touch enabled displays include Web pages that enable users to touch links to additional Web pages, video displays with various graphical buttons and slider mechanisms, document displays that enable a user to move the cursor to a selected location in the text by touching the location.

The diagram of FIG. 2 is not intended to indicate that the example process 200 is to include all of the states shown in FIG. 2. Rather, the example process 200 can be implemented using fewer or additional states not illustrated in FIG. 2.

Figure 3:
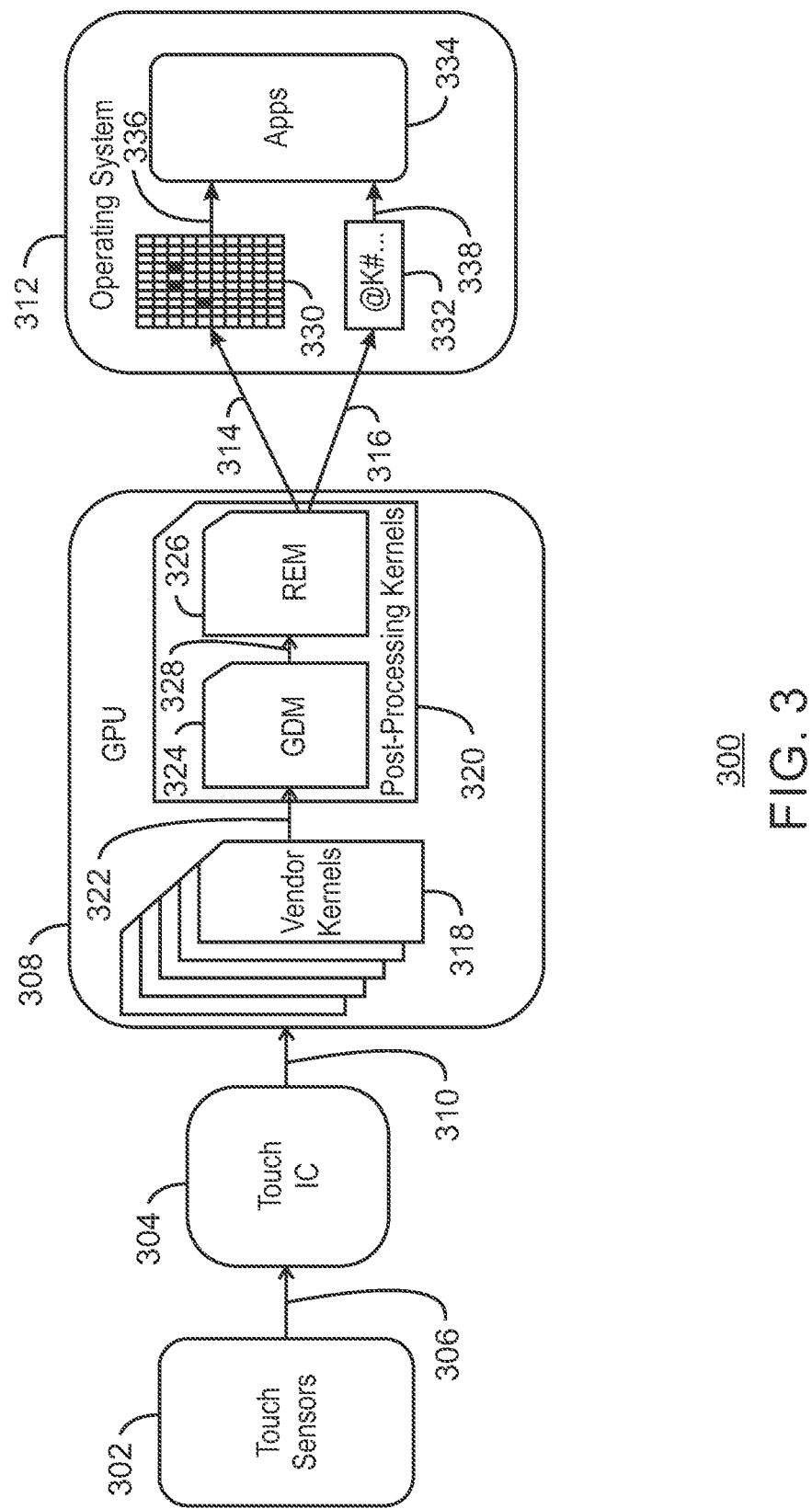
FIG. 3 is a schematic block diagram illustrating an example process for receiving input device data from a virtual input device on a second touch-enabled display.

FIG. 3 is a schematic block diagram illustrating an example system for receiving input device data from a virtual input device on a second touch-enabled display. The example system is referred to generally by the reference number 300 and can be implemented using the computing device 100 of FIG. 1 above.

The example system 300 includes touch sensors 302 coupled to a touch integrated circuit 304 as indicated by an arrow 306. The system includes a GPU 308 coupled to the touch IC 304 as indicated by an arrow 310. The system includes an operating system 312 communicatively coupled to the GPU 308 as indicated by arrows 314, 316. The GPU 308 includes a number of vendor kernels 318 and a number of post-processing kernels 320 communicatively coupled to the vendor kernels 318 as indicated by an arrow 322. The post-processing kernels 320 include a gesture detection module (GDM) 324 and a redirector and emulator module (REM) 326 communicatively coupled to the GDM 324 as indicated by an arrow 328. The operating system 312 further includes touch data 330 and input device data 332 received from the REM 326. The operating system 312 also includes a number of applications 334 shown receiving the touch data 330 and the input device data 332 as indicated by arrows 336 and 338, respectively.

As shown in FIG. 3, the touch IC 304 can collect raw touch sensor data from the touch sensors 302 and sent the raw touch sensor data to the GPU 308 via a dedicated hardware path as indicated by arrow 310. For example, the raw touch data can include touch and/or stylus sensor data. The raw touch sensor data can be received by the vendor kernels 318 of the GPU 308. The vendor kernels 318 can be touch/stylus algorithms from touch-enabled display vendors that can run on the GPU 308. For example, the vendor kernels 318 can convert the raw sensor data into screen co-ordinates depicting touch points. In addition to this, the system 300 allows for additional processing of the data at the post-processing kernels 320. The post-processing kernels 320 allow additional code to interpret multi-touch and stylus XY coordinates and associated stylus/pen data. For example, the raw data can be interpreted as gestures corresponding to pen-up, pen-down, hover, pressure, etc. The post-processing kernels 320 can then process the interpreted raw data and make additional decisions. The final processed data can then be send to the operating system 312 as indicated by arrows 314 and 316.

In some examples, the post-processing kernels 320 can include a virtual input device post-processing kernel 320. For example, the virtual input device post-processing kernel 320 can include a gesture detection module (GDM) 324 and a redirection and emulation module (REM) 326. As touch events are detected on a surface of a touch-enabled display via touch sensors 302, the touch IC 304 collects the raw data from the touch sensors 302 and the touch vendor kernels 318 process the raw touch sensor data and produce touch point data, which includes the XY coordinates for all the touch points on the screen. In some examples, the processed data can be in a standard Human Interface Device (HID) format and the post-processing kernels 320 can easily monitor this as the data is sent to the OS 312.

In some examples, the GDM 324 can constantly monitor the touch point data. For example, the GDM 324 can run a gesture detection algorithm for turning on this monitoring capability. In some examples, a specific trigger to display the virtual input device on the touch-enabled display can be predefined. For example, a trigger can be a gesture. In some examples, the gesture can be a detected placement of both hands on the screen, with both palms resting at bottom part of the screen, and all 10 fingers touching the screen. Since this is a normal gesture for people to type on a physical keyboard, and is therefore an intuitive gesture to bring up a virtual keyboard on the touch-enabled display. Another example of a gesture can be the user explicitly touching a seam where two screens meet and dragging down a virtual input device from the 'seam' onto the lower touch-enabled display. In some examples, the virtual input device can be dragged from any other edge of the touch-enabled display. Yet another gesture could be the user drawing a figure that can be used as a trigger. For example, the user can draw a letter "K" to bring up a virtual keyboard or a letter "T" to bring up a virtual touchpad. In some examples, the triggers can be configurable. For example, once a gesture is decided, it can be programmed in the GDM 324. In some examples, more than one trigger can also be programmed. Once the trigger to start the virtual input device is detected, the GDM module 324 can set an Input Device Active flag. The Input Device Active flag can then be shared with the REM 326.

In some examples, the (REM) 326 can operate in two modes based on the Input Device Active flag. For example, if the Input Device Active flag is not set, the REM 326 can work in pass-through mode and does not modify any touch data. Touch data can be delivered to the OS as touch HID reports. In some examples, the REM 326 can be a zero impact pass-through module. If the Input Device Active flag is set, the REM 326 can intercept all touch data and convert it into keyboard keystrokes or other input device data and send keyboard HID reports (or other HID reports specific to the emulated input device) to the OS 312 through a driver. For example, the driver can be the Intel Precise Touch Driver. This input device data can be delivered to the window in focus as determined by the OS 312. Thus, input device data can be delivered to the OS 312 using a similar mechanism to that used when hard keyboard data gets delivered to the OS 312.

In some examples, the REM 326 can also interact with a user level component (not shown) using a private HID interface. For example, a user interface module (UIM) can be an OS-based application 334 that can render a virtual input device layout user interface (UI) on a touch-enabled display. The private HID interface and messages are described in greater detail below.

The diagram of FIG. 3 is not intended to indicate that the example system 300 is to include all of the components shown in FIG. 3. Rather, the example system 300 can be implemented using fewer or additional components not illustrated in FIG. 3 (e.g., additional sensors, integrated circuits, kernels, GPUs, applications, etc.).

Figure 4:
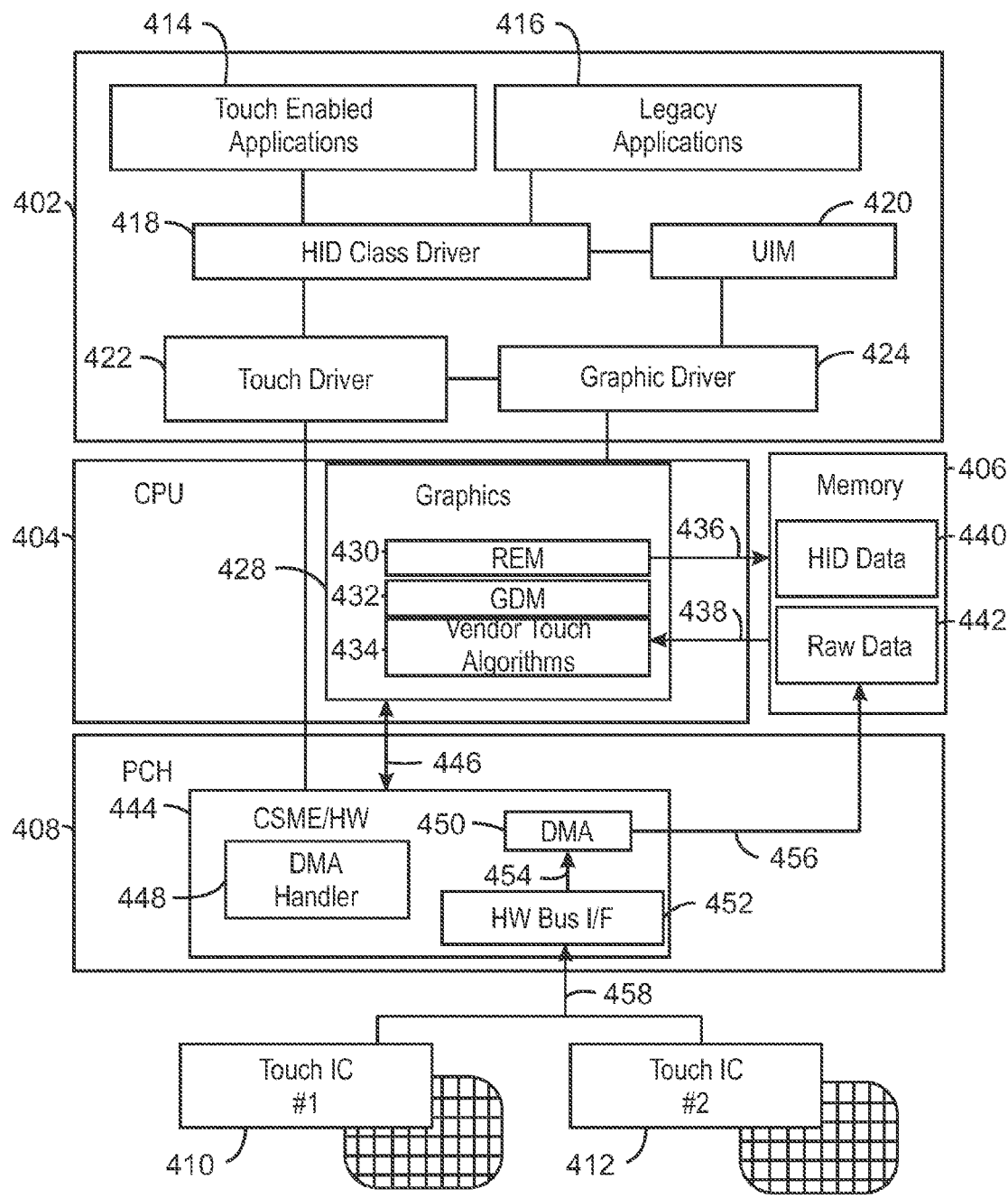
FIG. 4 is a block diagram illustrating an example system for generating hardware input from a virtual input device.

FIG. 4 is a block diagram illustrating an example system for generating hardware input from a virtual input device. The system is generally referred to by the reference number 400 and can be performed by the mobile computing device 100 of FIG. 1.

The system 400 includes software 402, a central processing unit (CPU) 404, memory 406, a Platform Controller Hub (PCH) 408, and two touch integrated circuits (ICs) 410, 412. The software 402 includes touch enabled applications 414, legacy applications 416, a Human Interface Device (HID) class driver 418, a user interface module 420, a touch driver 422, and a graphic driver 424. The CPU 404 includes a graphics processing unit (GPU) 428. The GPU 428 includes a redirector and emulator module (REM) 430, a gesture detector module (GDM) 432, and vendor touch algorithms 434. The REM 430 is communicatively coupled to the memory 406 as indicated by an arrow 436. The vendor touch algorithms 434 are also communicatively coupled to the memory 406 as indicated by an arrow 438. The memory 406 includes Human Interface Device (HID) data and Raw Data 442. The PCH 408 includes CSME hardware 444 that is communicatively coupled to the GPU 428 as indicated by an arrow 446. The CSME hardware 444 includes a Direct Memory Access (DMA) Handler 448, a DMA module 450, a hardware bus interface (HW Bus I/F) 452 coupled to the DMA 450 as indicated by an arrow 454. The DMA 450 is further coupled to the memory 406 as indicated by an arrow 456. The hardware bus interface 452 is coupled to the two touch ICs 410, 412 as indicated by arrow 458.

In some examples, the vendor touch algorithms 434, GDM 432 and REM 430 can be loaded into system memory by the touch driver 422 during a system startup phase. For example, the touch driver 422 can be the Intel Precise Touch driver. Thereafter, the vendor touch algorithms 434, GDM 432 and REM 430 can execute every time a touch data comes in from touch sensors through Touch ICs 410, 412 and the DMA 450. This OS-independent execution allows the vendor touch algorithms 434, GDM 432 and REM 430 to operate in such a way that the OS can detect a real input device such as a keyboard or touchpad.

In some examples, an additional feature can ensure that OS applications do not interfere with the virtual input device user interface that is displayed by the UIM 420. For example, no application windows may be allowed beneath a keyboard UI or above a keyboard UI. In some examples, when a lower touch-enabled display is being used as a keyboard, the UIM 420 can manage the contents of the touch-enabled display entirely. This allows the input device user interface to provide a clobber-free experience. As used herein, clobbering refers to an interruption in the operation of a virtual input device by applications or operating system and any associated visual distractions. For example, the operation of the virtual input device may continue, but the OS may display a notification window where a user's palms may be at the touch-enabled display.

In some examples, the graphics driver 424 as shown in the figure can be used to assist the implementation of the UIM. For example, when an event is sent to the UIM 420 to display the virtual keyboard user interface, a special interrupt is also sent to the graphics driver 424 by the REM 430. This special interrupt can instruct the graphics driver 424 to issue a Display Detach event to the OS. The Display Detach event can make the lower touch display (where the input device is to appear) disappear from OS enumeration. Thus, upon receiving the Display Detach event, the OS may be left with one display, and the OS may immediately move all the windows from the display of the lower touch-enabled display to the only remaining display on the upper touch-enabled display.

In some examples, the graphics driver 424 can provide a private interface to the UIM 420 for the UIM 420 to display a specific bitmap on the lower display. The UIM 420 can use this private interface to display the contents of the virtual keyboard. For example, the UIM 420 can be executed upon powering on the device 400 and can run in background and listen for HID events from the REM 430 on the private HID interface. The UIM 420 can receive a notification from the REM 430 on when to start and stop the virtual input device UI display. The UIM 420 can also inform the REM 430 about map layout using an HID set feature interface. For example, the map can enable the REM 430 to run in an autonomous fashion and convert XY co-ordinates or handwritten gestures to a specific key code without interacting with the UIM 420 on every co-ordinate translation or handwritten stroke. For example, the REM 430 can include a character recognition module that automatically detects and converts touch data received at a writing window into keyboard stroke data. Thus, the UIM 420 can be said to fully own displaying everything on the display of the second (in this case, lower) touch-enabled display. The OS therefore has no way to clobber this display.

In some examples, when the redirection mode is ended, the graphics driver 424 can notify the OS of the second display, and the two touch-enabled displays can then be fully functional displays for the operating system. For example, in a redirection mode the display of the upper touch-enabled display and upper screen touch may be available to the OS, while the display of the lower touch-enabled display and the lower touch-enabled display functionalities may be hidden from the OS. Instead, an emulated input device can be detected by the OS as a normal hardware input device. In normal mode, the upper and lower displays, as well as the upper and lower touch screen functionalities, are available to the OS. The emulated input device is thus not available to the OS in normal mode. The emulated input device can include, for example, a keyboard, a touchpad, a mouse key, and other special function keys in a similar fashion as they are available on modern hardware keyboards, in addition to a writing window. A writing window, as used herein, refers to an area in the virtual input device in which a user can write text with a stylus or finger.

Thus, from an architecture perspective, the methods described herein are performed seamlessly when integrated with existing methods. The only change when using different types of input devices comes from what the UIM user interface displays, and what specific HID messages are sent from the REM to the host OS. For example, the HID messages can differ based on keyboard, mouse, or touchpad messages.

The diagram of FIG. 4 is not intended to indicate that the example system 400 is to include all of the components shown in FIG. 4. Rather, the example system 400 can be implemented using fewer or additional components not illustrated in FIG. 4 (e.g., additional touch ICs, memory, GPUs, modules, applications, etc.).

Figure 5:
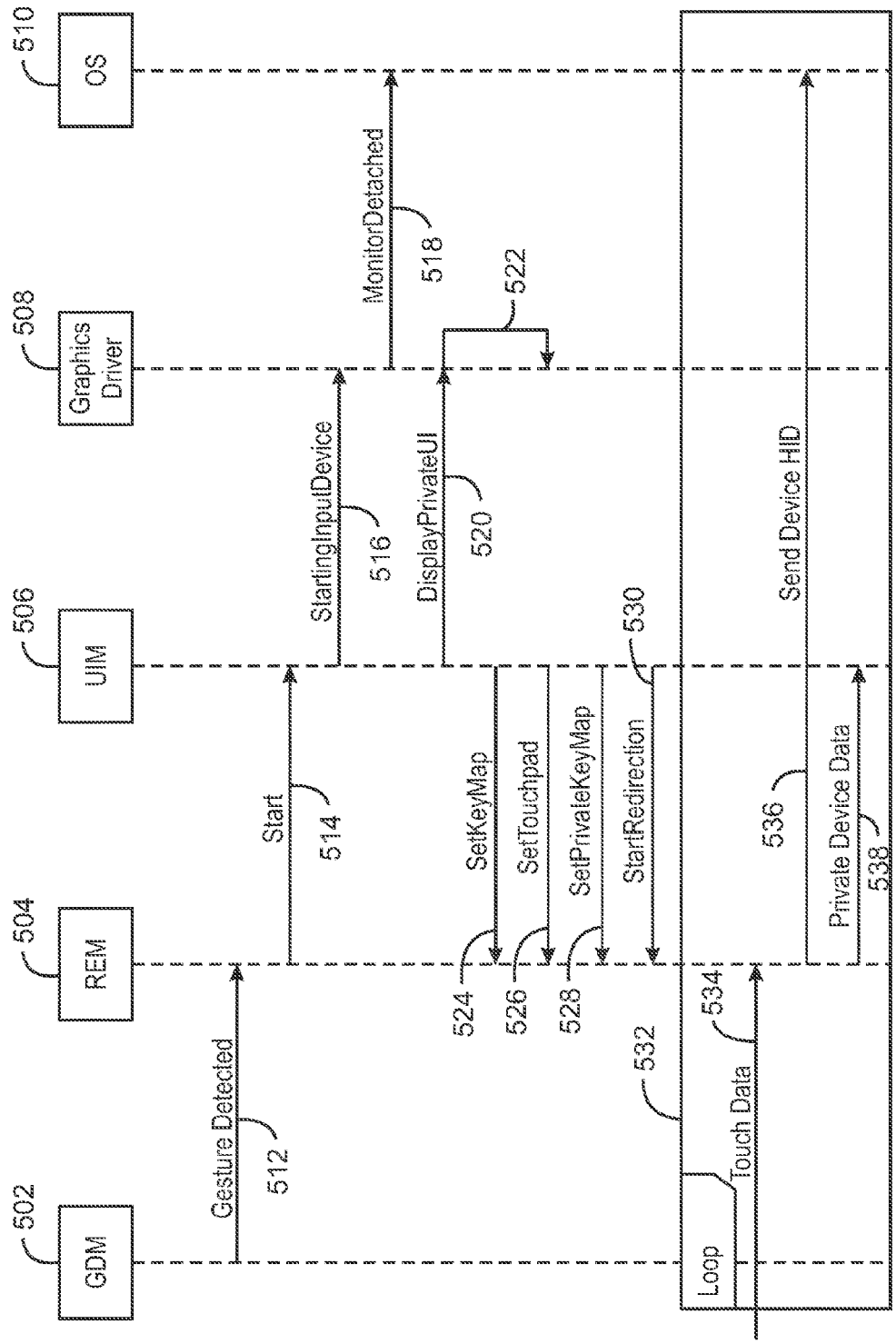
FIG. 5 is a sequence diagram illustrating a process for generating a virtual input device on a second touch-enabled display.

FIG. 5 is a control flow diagram illustrating a process for generating a virtual input device on a second touch-enabled display. The example process is generally referred to by the reference number 500 and can be implemented using the computing device 100 of FIG. 1.

The control flow diagram of FIG. 5 includes a GDM 502, an REM 504, a UIM 506, a graphics driver 508, and an OS 510. At time 512, the GMD 502 detects a trigger such as a gesture and sends a notification of the detected gesture to the REM 504. At time 514, the REM sends the UIM 506 a start notification. The start notification informs the UIM 506 that it is time to display the virtual input device user interface and send a KeyMap in the case of a keyboard. For example, the KeyMap can be sent using a Set Feature request. The REM 504 sends the Start notification when the GDM 502 sets the Input Device Active flag based on detection of a trigger such as a gesture. For example, a specific gesture may have been predefined or configured to be used to enable the virtual input device.

At time 516, the UIM sends a StartingInputDevice notification to the graphics driver 508. In some examples, the StartingInputDevice notification can be a special interrupt that is sent to the graphics driver 508. At time 518, the graphics driver 508 sends a MonitorDetached notification to the OS 510. As MonitorDetached notification is sent to the OS, the graphics driver 508 and SW reconfigures the display and associated memory to receive the display contents from the virtual input device.

At time 520 the UIM 506 sends a DisplayPrivateUI notification to the graphics driver 508. As indicated by arrow 522, the graphics driver 508 bypasses the OS 510 to directly display the private UI at the second touch-enabled display. In some examples, when the graphics driver 508 hides the display from the OS 510, the graphics driver 508 can allow the UIM 506 to display a bitmap on the hidden display. For example, the graphics driver 508 can provide a library application programming interface (API) for the UIM 506 to display the bitmap. This bitmap may include the input keyboard, touchpad, mouse or pen/stylus image variants. These variants can be loaded from the library and rendered using a graphics processing unit (GPU). In some examples, the UIM 506 can call the API any number of times to show different bitmaps. For example, the pressing of keys and other dynamic feedback may involve the display of different bitmaps.

At time 524, the UIM 506 sends a SetKeyMap notification to the REM 504. For example, the SetKeyMap notification can allow the UIM 506 to send a keymap to the REM 504 for an autonomous parsing thereafter. In some examples, a Key Map Table may contain the information that is provided by the UIM 506 to the REM 504 describing the keyboard key data. Every entry in the table contains a keycode and the corresponding key position. For example, language and locales can be included. In some examples, the co-ordinate system can assume a top-left corner of the screen as (0, 0). Position and size of the key can be defined by a rectangle specified by the top-left corner and bottom-right corner. This flexibility allows for keys of different sizes. For example a SHIFT key can be specified to be bigger than the character keys, and a SPACE key can be very large. The UIM 506 can define the coordinates.

In some examples, the Key Map Table can be a static map that can then can be provided to the REM 504. Any touches in the area defined by the Key Map Table can be reported to the OS as keyboard HID reports. The keyboard HID reports can also be reported to the UIM 506 through private Data HID reports as described below.

At time 526, the UIM 506 sends a SetTouchpad notification to the REM 504. For example, the SetTouchpad notification can allow the UIM 506 to send information about the position and size of the virtual touchpad, which may accompany a virtual keyboard. In some examples, a Touchpad Map Table similar to the KeyMap Table can be used. For example, the Touchpad Map Table can contain the co-ordinates and size of the virtual touchpad rectangle, as well as the sizes and positions of the left, middle and right touchpad buttons. Any touches in the area defined by entries in the Touchpad Map Table can be reported to the OS as the Touchpad HID packets. The Touchpad HID packets can also reported to the UIM 506 through private Data HID reports.

At time 528, the UIM 506 sends a SetPrivateKeyMap notification to the REM 504. For example, the SetPrivateKeyMap notification can allow the UIM 506 to send a keymap to the REM 504 for translating touches in some special regions to be privately sent to the UIM 506. In some examples, a Private Key Map table similar to the Key Map Table above can be used. The Private Key Map table can contain the co-ordinates and size of the keys that are considered private to the UIM 506. For example, any touches in the area defined by entries in this table are not reported to OS 510, but are instead reported to the UIM 506 through private Data HID reports. This allows the UIM 506 to reserve some space for special keys that can alter the behavior of the UI itself. For example, a special EXIT key can make the virtual keyboard disappear when pressed.

At time 530, the UIM 506 sends a StartRedirection notification 530 to the REM 504. The StartRedirection notification can activate the REM 504 to start suppressing touches and start sending keystrokes or touchpad events to the OS 510.

At time 532 a loop begins. The loop 532 includes the receiving of Touch Data at the REM 504 at time 534. In some examples, the Touch Data may have been processed by one or more vendor kernels as discussed above or by the GDM. The loop 532 further includes the sending of Device HID information from the REM 504 to the OS 510 at time 536. The loop 532 also includes the sending a PrivateDeviceData information from the REM 504 to the UIM 506 at time 538. For example, the REM 504 can send private data that shows what key(s) were pressed. Although the keystroke data also directly goes to the OS as indicated in time 536, this sideband notification allows the UIM 506 to further reflect something in the user interface. For example, when a user presses a soft keyboard button, the user interface may briefly change the color of the specific key(s) or activate a haptic feedback to provide a feeling of key press to the user. The PrivateDeviceData notification can enable such feedback.

In some examples, additional dynamic user interface adjustments can be performed. For example, a virtual touchpad can be dynamically placed keeping in mind the placement of a user's palms. The virtual touchpad can be placed in between two palms, but if user moves the palms, the virtual touchpad can be moved around. The UIM 506 can thus send SetTouchPadMap set feature requests anytime to change the behavior. In some examples, a user-draggable control can be used that allows the virtual touchpad to be manually moved by the user to a desired location. For example, private keys can be used to allow such a level of control.

This control flow diagram is not intended to indicate that the events of the example process 500 are to be executed in any particular order, or that all of the events are to be included in every case. Further, any number of additional events not shown may be included within the example process 500, depending on the details of the specific implementation. For example, although the way to enter the virtual input device redirection mode is illustrated via a detected gesture, any form of trigger can be used alternatively, such as some specific hardware buttons, or the placement of the device in certain specific way. In addition, the GDM 502 can continue to detect gestures while in the redirection mode after time 530. Although this continued detection is not shown in the flows, such continued detection can provide additional functionality of recognizing gestures. For example, a gesture including dragging the palm and fingers at a fast speed from left to right can be used make the keyboard disappear and the system return to a normal mode. Furthermore, a notification to the graphics driver 508 can also be sent directly from the REM 504. For example, StartingInputDevice 516 message can be sent directly by REM 504 to Graphics Driver 508. This may allow the graphics driver 508 to send the MonitorDetached 518 message to the OS 510 in advance and be ready to receive the DisplayPrivateUI 520 message. Sending the StartingInputDevice 516 message directly from the REM 504 to the graphics driver 508 can make the transition to the redirection mode faster.

Figure 6:
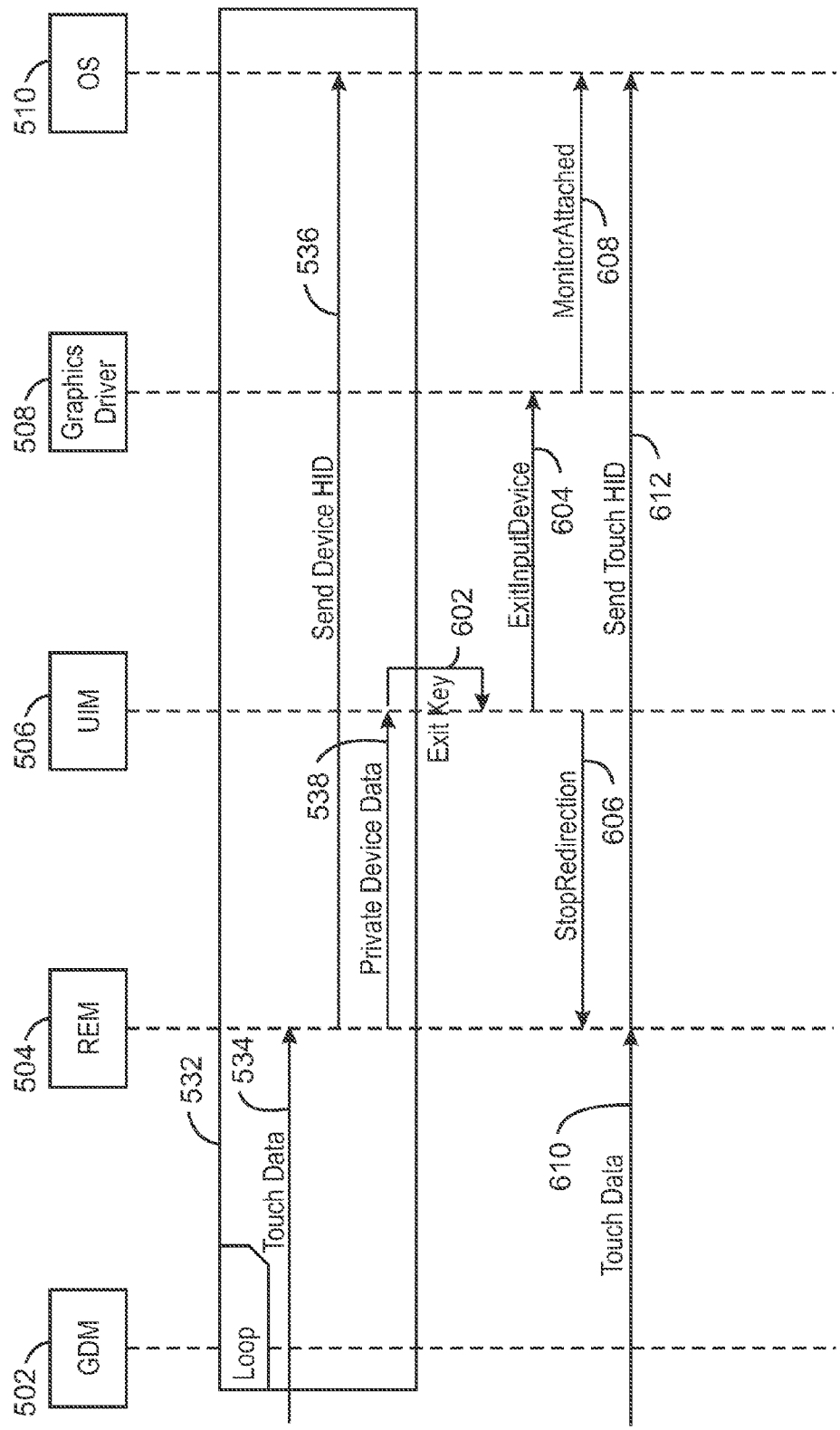
FIG. 6 is a sequence diagram illustrating a process for disabling a virtual input device on a second touch-enabled display.

FIG. 6 is a control flow diagram illustrating a process for disabling a virtual input device on a second touch-enabled display. The example process is generally referred to by the reference number 600 and can be implemented using the mobile computing device 100 of FIG. 1.

The control flow diagram of FIG. 6 also includes a GDM 502, an REM 504, a UIM 506, a graphics driver 508, and an OS 510. The control flow diagram further includes the loop 532 discussed in detail with respect to FIG. 5 above.

However, at time 602, the loop 532 is broken by the detection of an exit key at the UIM 506. For example, a Stop notification can allow the REM 504 to scan for specific key sequence, or detect a stop gesture in collaboration with the GDM 502 and send a Stop notification to the UIM 506 to kill the input device UI. At time 604, an ExitInputDevice notification is sent to the graphics driver 508 from the UIM 506. At time 606, a StopRedirection notification is sent from the UIM 506 to the REM 504. For example, the StopRedirection notification can allow the UIM 506 to instruct the REM 504 to return to a normal pass-through mode. Although this can be done by REM 504 itself, the StopRedirection notification allows further flexibility for an implementation to decide and allow multiple ways to return to normal mode. At the same time 608, the graphics driver 508 sends a MonitorAttached notification to the OS 510. At time 610, the REM 504 receives Touch Data. At time 612, the REM 504 sends Touch HID data to the OS 510.

This control flow diagram is not intended to indicate that the events of the example process 600 are to be executed in any particular order, or that all of the events are to be included in every case. Further, any number of additional events not shown may be included within the example process 600, depending on the details of the specific implementation. For example, the way to exit the keyboard mode can be via another touch gesture, or via some specific hardware button, or a specific assigned key on the virtual keyboard.

Figure 7:
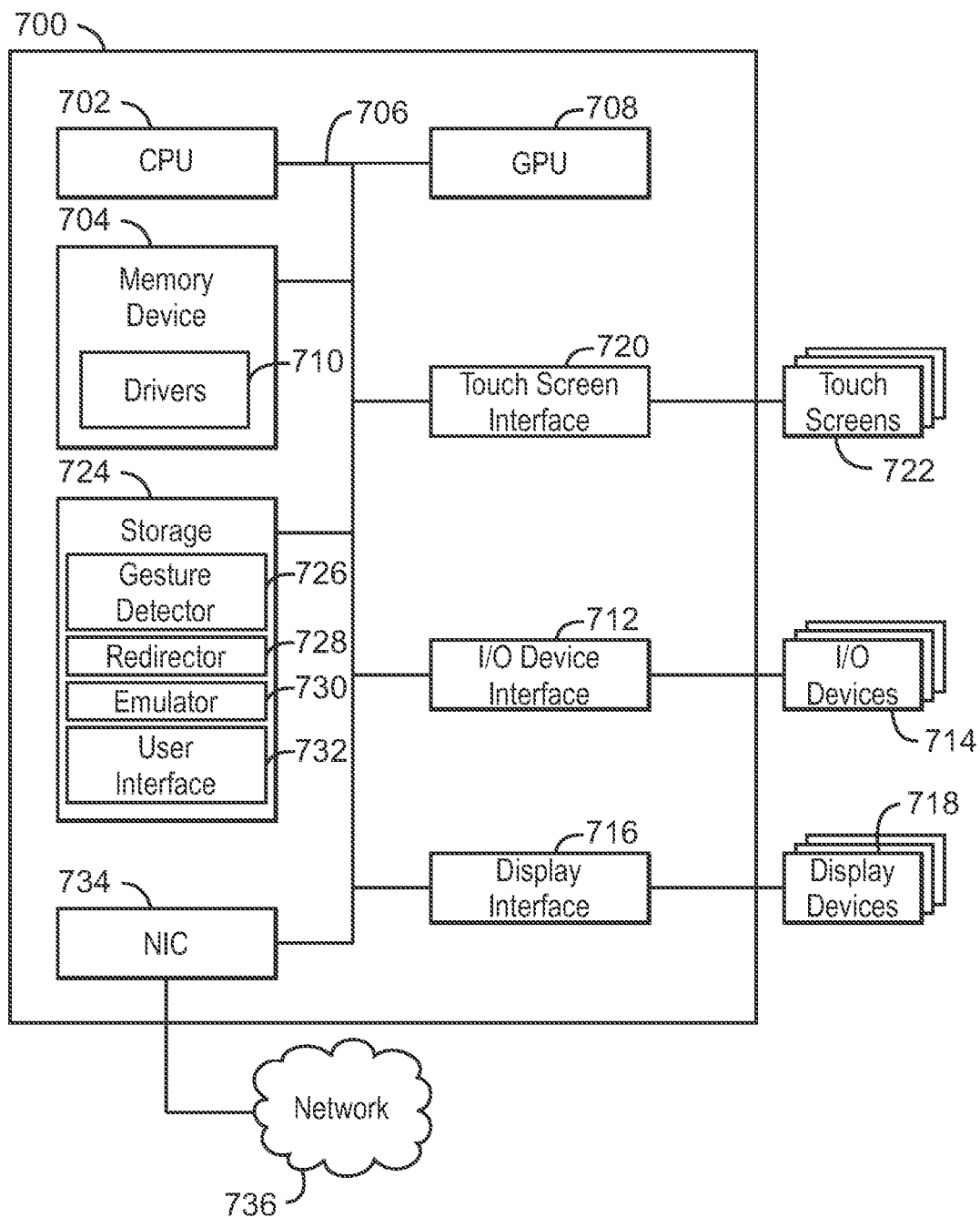
FIG. 7 is a block diagram illustrating an example computing device that can be used to generate hardware input from a virtual input device on a second touch-enabled display.

FIG. 7 is a block diagram shown illustrating an example computing device that can be used to generate hardware input from a virtual input device on a second touch-enabled display. The computing device 700 may be, for example, a laptop computer, desktop computer, tablet computer, mobile device, or server, among others. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for generating virtual input devices. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 may also include a touch-enabled display interface 720 configured to connect the computing device 700 to touch-enabled displays 722. For example, the computing device 700 can receive touch or stylus input via the touch-enabled display interface.

The computing device also includes a storage device 724. The storage device 724 is a physical memory such as a hard drive, an optical drive, a thumbdrive, an array of drives, or any combinations thereof. The storage device 724 may also include remote storage drives. The storage device 724 includes a gesture detector 726, a redirector 728, an emulator 730, and a user interface 732. The gesture detector 726 can detect an input device trigger from one of two coupled touch-enabled displays. The redirector 728 can intercept touch data from the triggered touch-enabled display. The emulator 730 can generate hardware input data based on the intercepted touch data and send the hardware input data to an operating system. For example, the hardware input data can include Human Interface Device (HID) packets corresponding to keyboard strokes. The user interface 732 can display a virtual input device on the triggered touch-enabled display and receive touch data via the virtual input device. For example, the virtual input device can include an emulated keyboard, touchpad, and a writing window, among other types of input. In some examples, the user interface 732 can receive a start request from the emulator and send a start input device request to a graphics driver. For example, the graphics driver can detach a display of the triggered touch-enabled display from the operating system response to receiving the start input device request. In some examples, the user interface 732 can receive a start request from the emulator and send a request to a graphics driver to display the virtual input device. In some examples, the emulator 730 can further generate private device data based on the intercepted touch data and send the private device data to a user interface to display feedback. For example, the feedback can be a replaced bitmap of a key in response to receiving touch data corresponding to a touch of the key. In some examples, the emulator 730 can recognize characters in the intercepted touch data and generate hardware input data such as keyboard strokes corresponding to the recognized characters. For example, the intercepted touch data can include one or more handwritten strokes received inside a writing window displayed by the user interface. Since the OS and applications receive hardware keyboard data rather than touch data, the OS and applications can use the keyboard data without any character recognition at or changes to the OS or applications.

The computing device 700 may also include a network interface controller (NIC) 734. The NIC 734 may be configured to connect the computing device 700 through the bus 706 to a network 736. The network 736 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The block diagram of FIG. 7 is not intended to indicate that the computing device 700 is to include all of the components shown in FIG. 7. Rather, the computing system 700 can include fewer or additional components not illustrated in FIG. 7, such as additional engines, additional network interfaces, and the like. The computing device 700 may include any number of additional components not shown in FIG. 7, depending on the details of the specific implementation. Furthermore, any of the functionalities of the CPU 702 may be partially, or entirely, implemented in hardware and/or in a processor. For example, the functionality of the gesture detector 726, the redirector 728, the emulator 730, and the user interface 732 may be implemented with an application specific integrated circuit, in logic implemented in a processor, in logic implemented in a specialized graphics processing unit, or in any other device.

Figure 8:
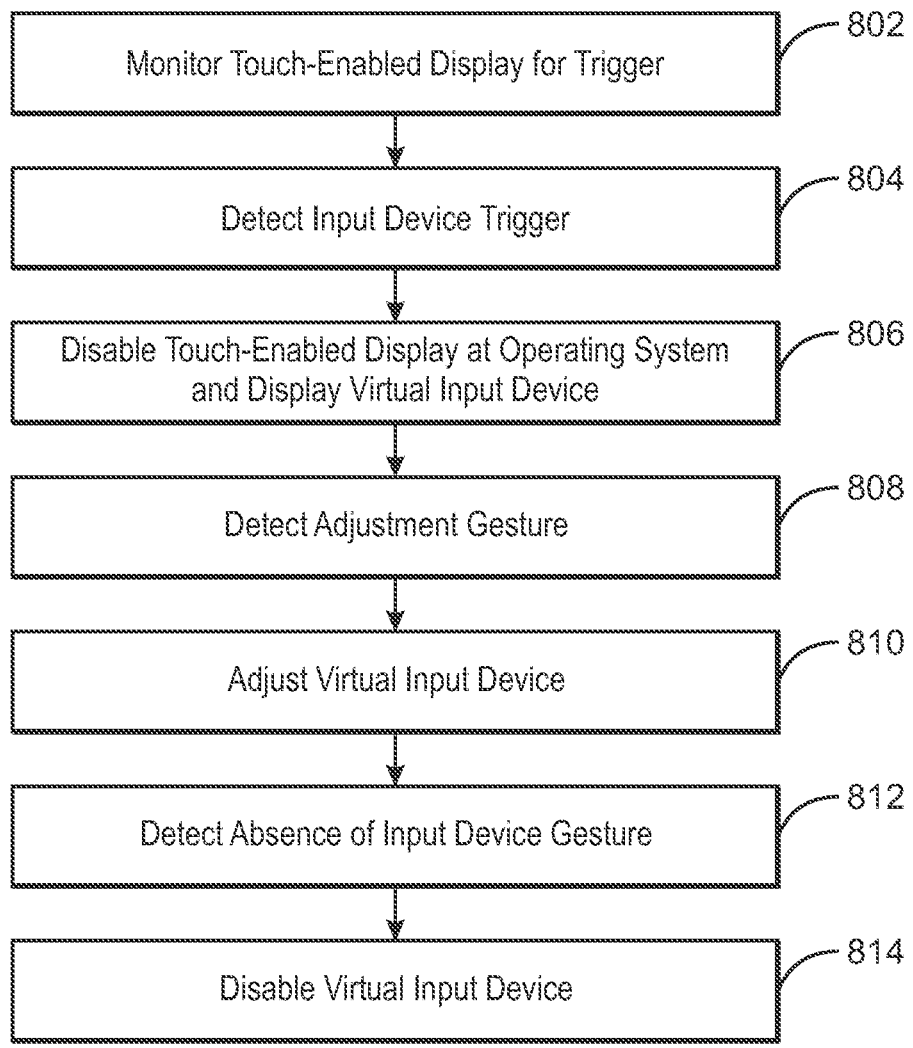
FIG. 8 is a flow chart illustrating a process for displaying a virtual input device on a second touch-enabled display.

FIG. 8 is a flow chart illustrating a process for displaying a virtual input device on a second touch-enabled display. The example process is generally referred to by the reference number 800 and can be implemented using the processor 702 of the computing device 700 of FIG. 7 above. For example, the process can be performed by the gesture detector 726, the redirector 728, emulator 730, and user interface 732 of FIG. 7.

At block 802, the gesture detector monitors a touch-enabled display for gestures. In some examples, the gesture can monitor two or more touch-enabled displays for gestures.

At block 804, the gesture detector detects an input device trigger from a touch-enabled display. For example, the input device trigger can be a gesture, a hardware button, or a placement of the touch-enabled display.

At block 806, the user interface disables the touch-enabled display at an operating system and displays virtual input device on the disabled touch-enabled display. For example, the touch-enabled display may display a virtual keyboard or a virtual touchpad. In some examples, the virtual input device can include a writing window to receive one or more handwritten strokes to be converted to keyboard strokes. In some examples, disabling the touch-enabled display can include sending a message to the operating system that the touch-enabled display has been detached.

At block 808, the user interface detects an adjustment gesture. For example, the adjustment gesture can be a movement between two detected palms. In some examples, the display may include a user-draggable control on the disabled touch-enabled display.

At block 810, the user interface adjusts a virtual input device. For example, the virtual input device can be made smaller or larger based on the detected adjustment gesture. In some examples, the virtual input device can be relocated on the touch-enabled display based on the detected adjustment gesture. In some examples, and the user interface can move the virtual input device to a new location based on touch data received at the user-draggable control.

At block 812, the gesture detector detects an absence of any input device gesture. For example, a user may have removed both hands from the touch-enabled display.

At block 814, the user interface disables the virtual input device. For example, the virtual input device may disappear from the touch-enabled display and the touch-enabled display may return to a default mode of operation. In some examples, the user interface can disable the virtual input device by detecting an exit trigger and disabling the virtual input device in response to detecting the exit trigger. In some examples, the user interface can disable the virtual input device in response to detecting a predefined placement of the touch-enabled display. For example, the touch-enabled display may be placed in a reading or book mode and the virtual input device may disappear.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation. For example, the gesture detector can continuously monitor the touch-enabled display for additional gestures and the user interface can then disable the virtual input device in response to detecting an exit gesture.

Figure 9:
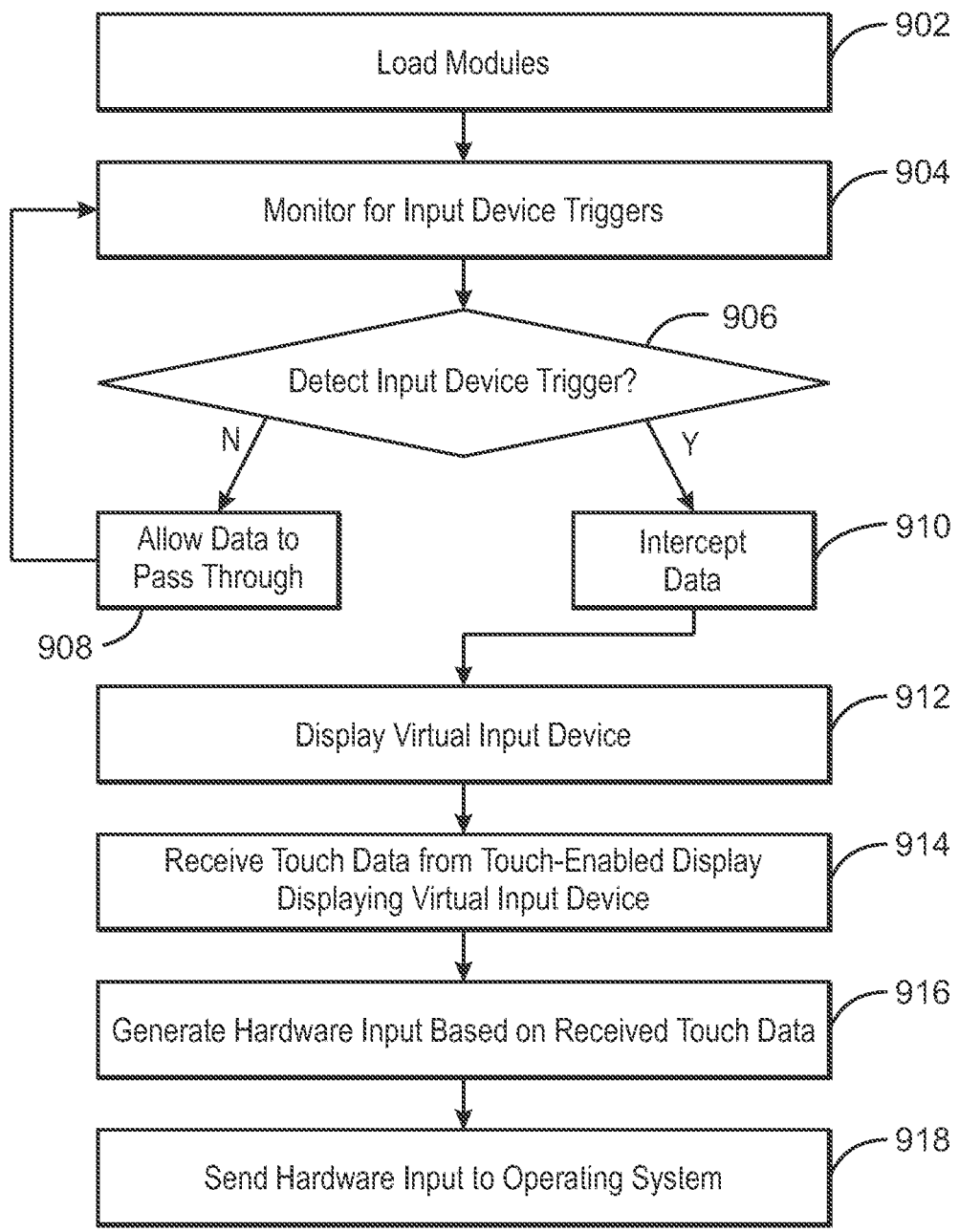
FIG. 9 is a flow chart illustrating a process for generating hardware input from a virtual input device.

FIG. 9 is a flow chart illustrating a process for generating hardware input from a virtual input device. The example process is generally referred to by the reference number 900 and can be implemented using the processor 702 of the computing device 700 of FIG. 7 above. For example, the process can be performed by the gesture detector 726, the redirector 728, the emulator 730, and the user interface 732 of FIG. 7.

At block 902, the processor loads modules. For example, the gesture detector, redirector, emulator and user interface may be loaded by the processor upon bootup of the computing device.

At block 904, the gesture detector monitors a touch-enabled display for input device triggers. For example, an input device trigger can be a gesture, a button press, or a placement of the touch-enabled display.

At block 906, the gesture detector determines whether an input device trigger has been detected at the touch-enabled display. If an input device trigger is detected, then the method may proceed to block 910. If an input device trigger is not detected, then the method may proceed at block 908.

At block 908, the redirector allows data from the touch-enabled display to pass through to the operating system in response to not detecting an input device trigger.

At block 910, the redirector intercepts data from the touch-enabled display in response to detecting the input device trigger. For example, raw touch data from the touch-enabled display can be captured and redirected from the operating system. In some examples, a monitor detachment notification can be sent to the operating system. For example, the operating system can move any windows from the disabled touch-enabled display to another touch-enabled display.

At block 912, the emulator displays a virtual input device on the touch-enabled display. For example, the virtual input device may be a virtual keyboard, a virtual touchpad, among other possible virtual input devices, such as a writing window. For example, a writing window can be an input box to receiving handwritten characters such as letters, digits, or other characters.

At block 914, the emulator receives touch data from the touch-enabled display displaying the virtual input device. For example, the touch data can be raw touch data including coordinates of detected touches among other information.

At block 916, the emulator generates hardware input based on the received touch data. For example, the hardware input can include Human Interface Device (HID) data corresponding to hardware such as a keyboard and touchpad. In some examples, the emulator can generate private device data based on the received touch data. In some examples, the emulator can perform character recognition on the received touch data and convert detected characters into hardware input.

At block 918, the emulator sends the hardware input to the operating system. For example, the operating system may receive the hardware input as if the emulator was a hardware keyboard or a hardware touchpad. In some examples, the emulator can also send the private device data to a virtual input device to provide feedback.

This process flow diagram is not intended to indicate that the blocks of the example process 900 are to be executed in any particular order, or that all of the blocks are to be included in every case. Further, any number of additional blocks not shown may be included within the example process 900, depending on the details of the specific implementation.

Figure 10:
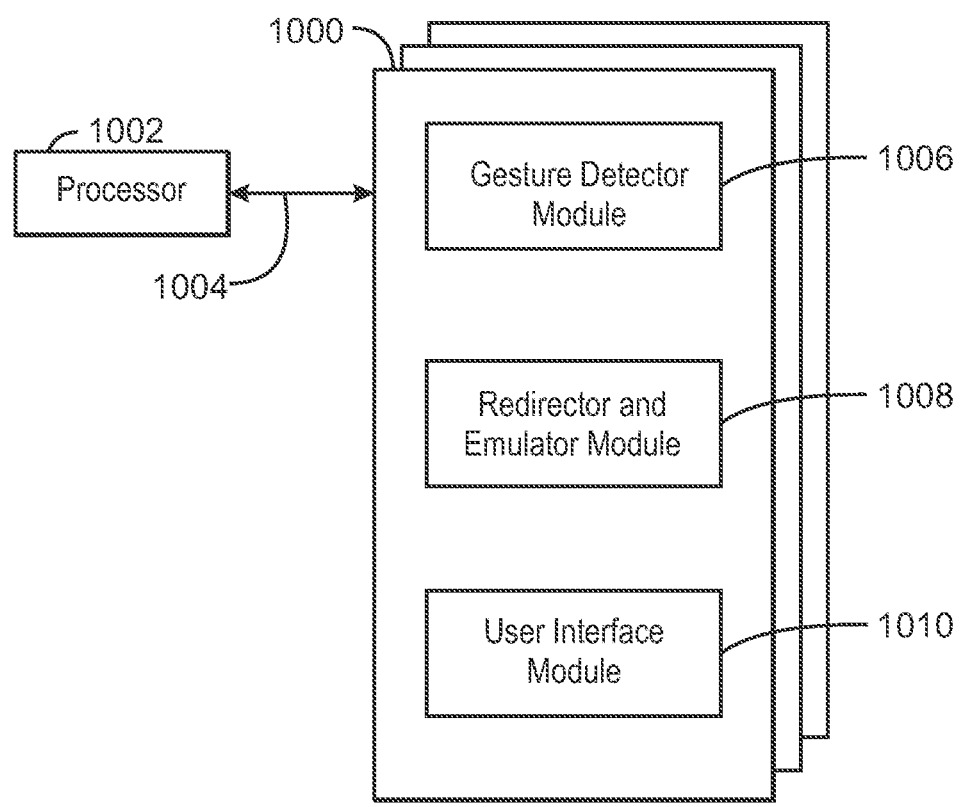
FIG. 10 is a block diagram showing computer readable media that stores code for generating hardware input data.

FIG. 10 is a block diagram showing computer readable media 1000 that store code for generating hardware input data. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, a gesture detector module 1006 may be configured to detect an input device trigger from one of two coupled touch-enabled displays. A redirector and emulator module 1008 may be configured to intercept touch data from the triggered touch-enabled display. A user interface module 1010 may be configured to display of a virtual input device on the triggered touch-enabled display. The redirector and emulator module 1008 may be configured to generate hardware input data based on the intercepted touch data. The redirector and emulator module 1008 may be configured to send the hardware input data to an operating system. In some examples, the user interface module 1010 may be configured to receive a start request and send a start input device request to a graphics driver. For example, the graphics driver can detach a display of the triggered touch-enabled display from the operating system response to receiving the start input device request. In some examples, the user interface module 1010 may be configured to receive a start request from the emulator and send a request to a graphics driver to display the virtual input device. In some examples, the redirector and emulator module 1008 may be configured to generate private device data based on the intercepted touch data and send the private device data to a virtual input device to display feedback. For example, the feedback can be visual feedback in the form of an updated bitmap with a pressed button. In some examples, the user interface module 1010 may be configured to disable the virtual input device in response to detecting an exit trigger. For example, the user interface module 1010 may be configured to send an ExitInputDevice notification to a graphics driver in response to detecting an exit trigger.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation.

EXAMPLES

Example 1 is a system for generating hardware device input. The system includes a gesture detector to detect an input device trigger from one of two coupled touch-enabled displays. The system also includes a redirector to intercept touch data from a triggered touch-enabled display. The system further includes an emulator to generate hardware input data based on the intercepted touch data and send the hardware input data to an operating system. The system also further includes a user interface to display a virtual input device on the triggered touch-enabled display and receive touch data via the virtual input device.

Example 2 includes the system of example 1, including or excluding optional features. In this example, the user interface is to receive a start request from the emulator and send a start input device request to a graphics driver. The graphics driver is to detach the triggered touch-enabled display from the operating system in response to receiving the start input device request.

Example 3 includes the system of any one of examples 1 to 2, including or excluding optional features. In this example, the user interface is to receive a start request from the emulator and send a request to a graphics driver to display the virtual input device.

Example 4 includes the system of any one of examples 1 to 3, including or excluding optional features. In this example, the emulator is to generate private device data based on the intercepted touch data and send the private device data to a user interface to display feedback.

Example 5 includes the system of any one of examples 1 to 4, including or excluding optional features. In this example, the system includes a graphics processing unit. The graphics processing unit includes the gesture detector, the redirector, and the emulator.

Example 6 includes the system of any one of examples 1 to 5, including or excluding optional features. In this example, the system includes a keymap to be used by the emulator module to generate the hardware input data based on the intercepted touch data.

Example 7 includes the system of any one of examples 1 to 6, including or excluding optional features. In this example, the user interface is to display private keys to be used to modify or relocate the virtual input device.

Example 8 includes the system of any one of examples 1 to 7, including or excluding optional features. In this example, the virtual input device includes a virtual keyboard, a virtual touchpad, a writing window, or any combination thereof.

Example 9 includes the system of any one of examples 1 to 8, including or excluding optional features. In this example, the virtual input device includes a virtual keyboard and the hardware input data includes Human Interface Device (HID) packets corresponding to keyboard strokes.

Example 10 includes the system of any one of examples 1 to 9, including or excluding optional features. In this example, the virtual input device includes a writing window and the emulator is to recognize characters in the intercepted touch data and generate the hardware input data including keyboard strokes corresponding to the recognized characters.

Example 11 is a method for generating hardware device input. The method includes monitoring a touch-enabled display for an input device trigger. The method also includes detecting the input device trigger from the touch-enabled display. The method further includes disabling the touch-enabled display at an operating system in response to detecting the input device trigger. The method also further includes displaying a virtual input device on the disabled touch-enabled display in response to detecting the trigger.

Example 12 includes the method of example 11, including or excluding optional features. In this example, the method includes receiving touch data from the virtual input device. The method also includes generating hardware input based on the received touch data. The method further includes sending the hardware input to the operating system.

Example 13 includes the method of any one of examples 11 to 12, including or excluding optional features. In this example, the method includes detecting an adjustment gesture and adjusting the virtual input device based on the adjustment gesture.

Example 14 includes the method of any one of examples 11 to 13, including or excluding optional features. In this example, the method includes detecting an absence of an input device trigger and disabling the virtual input device in response to detecting the absence of the input device trigger.

Example 15 includes the method of any one of examples 11 to 14, including or excluding optional features. In this example, disabling the touch-enabled display includes sending a message to the operating system that the touch-enabled display has been detached.

Example 16 includes the method of any one of examples 11 to 15, including or excluding optional features. In this example, the method includes detecting an exit trigger and disabling the virtual input device in response to detecting the exit trigger.

Example 17 includes the method of any one of examples 11 to 16, including or excluding optional features. In this example, the method includes receiving touch data from the virtual input device. The method also includes generating private device data based on the received touch data. The method further includes sending the private device data to a user interface to provide feedback.

Example 18 includes the method of any one of examples 11 to 17, including or excluding optional features. In this example, the method includes displaying a user-draggable control on the disabled touch-enabled display and moving the virtual input device to a new location based on touch data received at the user-draggable control.

Example 19 includes the method of any one of examples 11 to 18, including or excluding optional features. In this example, the method includes monitoring the touch-enabled display for additional gestures and disabling the virtual input device in response to detecting an exit gesture.

Example 20 includes the method of any one of examples 11 to 19, including or excluding optional features. In this example, the method includes disabling the virtual input device in response to detecting a predefined placement of the touch-enabled display.

Example 21 is at least one computer readable medium for generating hardware input data having instructions stored therein that. The computer-readable medium includes instructions that direct the processor to detect an input device trigger from one of two coupled touch-enabled displays. The computer-readable medium includes instructions that direct the processor to intercept touch data from the triggered touch-enabled display. The computer-readable medium includes instructions that direct the processor to display a virtual input device on the triggered touch-enabled display. The computer-readable medium includes instructions that direct the processor to generate hardware input data based on the intercepted touch data; and send the hardware input data to an operating system.

Example 22 includes the computer-readable medium of example 21, including or excluding optional features. In this example, the computer-readable medium includes instructions to receive a start request and send a start input device request to a graphics driver. The graphics driver is to detach the triggered touch-enabled display from the operating system response to receiving the start input device request.

Example 23 includes the computer-readable medium of any one of examples 21 to 22, including or excluding optional features. In this example, the computer-readable medium includes instructions to receive a start request from the emulator and send a request to a graphics driver to display the virtual input device.

Example 24 includes the computer-readable medium of any one of examples 21 to 23, including or excluding optional features. In this example, the computer-readable medium includes instructions to generate private device data based on the intercepted touch data and send the private device data to a user interface to display feedback.

Example 25 includes the computer-readable medium of any one of examples 21 to 24, including or excluding optional features. In this example, the computer-readable medium includes instructions to disable the virtual input device in response to detecting an exit trigger.

Example 26 includes the computer-readable medium of any one of examples 21 to 25, including or excluding optional features. In this example, the computer-readable medium includes instructions to receive touch data from the virtual input device. The computer-readable medium includes instructions that direct the processor to generate hardware input based on the received touch data. The computer-readable medium includes instructions that direct the processor to send the hardware input to the operating system Example 27 includes the computer-readable medium of any one of examples 21 to 26, including or excluding optional features. In this example, the computer-readable medium includes instructions to monitor the touch-enabled display for additional gestures and disable the virtual input device in response to detecting an exit gesture:

Example 28 includes the computer-readable medium of any one of examples 21 to 27, including or excluding optional features. In this example, the computer-readable medium includes instructions to detect an absence of an input device trigger and disable the virtual input device in response to detecting the absence of the input device trigger.

Example 29 includes the computer-readable medium of any one of examples 21 to 28, including or excluding optional features. In this example, the computer-readable medium includes instructions to detect an adjustment gesture and adjust the virtual input device based on the adjustment gesture.

Example 30 includes the computer-readable medium of any one of examples 21 to 29, including or excluding optional features. In this example, the computer-readable medium includes instructions to detect an exit trigger and disabling the virtual input device in response to detecting the exit trigger.

Example 31 is a system for generating hardware device input. The system includes means for detecting an input device trigger from one of two coupled touch-enabled displays. The system also includes means for intercepting touch data from the triggered touch-enabled display. The system further includes means for generating hardware input data based on the intercepted touch data. The system also further includes means for sending the hardware input data to an operating system. The system also includes means for displaying a virtual input device on the triggered touch-enabled display.

Example 32 includes the system of example 31, including or excluding optional features. In this example, the system includes means for receiving a start request from the emulator and send a start input device request to a graphics driver. The graphics driver is to detach the triggered touch-enabled display from the operating system response to receiving the start input device request.

Example 33 includes the system of any one of examples 31 to 32, including or excluding optional features. In this example, the system includes means for receiving a start request from the emulator and send a request to a graphics driver to display the virtual input device.

Example 34 includes the system of any one of examples 31 to 33, including or excluding optional features. In this example, the means for intercepting touch data is to further generate private device data based on the intercepted touch data and send the private device data to a user interface to display feedback.

Example 35 includes the system of any one of examples 31 to 34, including or excluding optional features. In this example, the system includes means for processing graphics.

Example 36 includes the system of any one of examples 31 to 35, including or excluding optional features. In this example, the system includes means for generating the hardware input data based on the intercepted touch data.

Example 37 includes the system of any one of examples 31 to 36, including or excluding optional features. In this example, the system includes means for modifying or relocating the virtual input device.

Example 38 includes the system of any one of examples 31 to 37, including or excluding optional features. In this example, the virtual input device includes a virtual keyboard, a virtual touchpad, a writing window, or any combination thereof.

Example 39 includes the system of any one of examples 31 to 38, including or excluding optional features. In this example, the virtual input device includes a virtual keyboard and the hardware input data includes Human Interface Device (HID) packets corresponding to keyboard strokes.

Example 40 includes the system of any one of examples 31 to 39, including or excluding optional features. In this example, the virtual input device includes a writing window and the means for generating hardware input data is to recognize characters in the intercepted touch data and generate the hardware input data including keyboard strokes corresponding to the recognized characters.

Example 41 is an apparatus for generating hardware device input. The apparatus includes a gesture detector to detect an input device trigger from one of two coupled touch-enabled displays. The apparatus also includes a redirector to intercept touch data from the triggered touch-enabled display. The apparatus further includes an emulator to generate hardware input data based on the intercepted touch data and send the hardware input data to an operating system. The apparatus also further includes a user interface to display a virtual input device on the triggered touch-enabled display and receive touch data via the virtual input device.

Example 42 includes the apparatus of example 41, including or excluding optional features. In this example, the apparatus includes a user interface to receive a start request from the emulator and send a start input device request to a graphics driver. The graphics driver is to detach the triggered touch-enabled display from the operating system response to receiving the start input device request.

Example 43 includes the apparatus of any one of examples 41 to 42, including or excluding optional features. In this example, the apparatus includes a user interface to receive a start request from the emulator and send a request to a graphics driver to display the virtual input device.

Example 44 includes the apparatus of any one of examples 41 to 43, including or excluding optional features. In this example, the emulator is to further generate private device data based on the intercepted touch data and send the private device data to a user interface to display feedback.

Example 45 includes the apparatus of any one of examples 41 to 44, including or excluding optional features. In this example, the apparatus includes a graphics processing unit. The graphics processing unit includes the gesture detector, the redirector, and the emulator.

Example 46 includes the apparatus of any one of examples 41 to 45, including or excluding optional features. In this example, the apparatus includes a keymap to be used by the emulator module to generate the hardware input data based on the intercepted touch data.

Example 47 includes the apparatus of any one of examples 41 to 46, including or excluding optional features. In this example, the display further includes private keys to be used to modify or relocate the virtual input device.

Example 48 includes the apparatus of any one of examples 41 to 47, including or excluding optional features. In this example, the apparatus is a mobile computing device.

Example 49 includes the apparatus of any one of examples 41 to 48, including or excluding optional features. In this example, the virtual input device includes a virtual keyboard, a virtual touchpad, a writing window, or any combination thereof.

Example 50 includes the apparatus of any one of examples 41 to 49, including or excluding optional features. In this example, the virtual input device includes a writing window and the emulator is to recognize characters in the intercepted touch data and generate the hardware input data including keyboard strokes corresponding to the recognized characters.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for generating hardware device input, comprising:
    a gesture detector to detect an input device trigger from one of two coupled touch-enabled displays;
    a redirector to intercept touch data from a triggered touch-enabled display;
    an emulator to generate hardware input data based on the intercepted touch data and send the hardware input data to an operating system; and
    a user interface to display a virtual input device on the triggered touch-enabled display and receive touch data via the virtual input device, wherein the user interface is to receive a start request from the emulator and send a request to a graphics driver to display the virtual input device, and send a message to an operating system that the touch-enabled display is detached in response to detecting the input device trigger from the touch-enabled display.

2. The system of claim 1, wherein the graphics driver is to detach a display of the triggered touch-enabled display from the operating system in response to receiving the start input device request.

3. The system of claim 1, wherein the emulator is to further generate private device data based on the intercepted touch data and send the private device data to the virtual input device to display feedback.

4. The system of claim 1, comprising a graphics processing unit, the graphics processing unit comprising the gesture detector, the redirector, and the emulator.

5. The system of claim 1, comprising a keymap to be used by the emulator to generate the hardware input data based on the intercepted touch data.

6. The system of claim 1, wherein the user interface is to display private keys to be used to modify or relocate the virtual input device.

7. The system of claim 1, wherein the virtual input device comprises a virtual keyboard, a virtual touchpad, a writing window, or any combination thereof.

8. The system of claim 1, wherein the virtual input device comprises a virtual keyboard and the hardware input data comprises Human Interface Device (HID) packets corresponding to keyboard strokes.

9. The system of claim 1, wherein the virtual input device comprises a writing window and the emulator is to recognize characters in the intercepted touch data and generate the hardware input data comprising keyboard strokes corresponding to the recognized characters.

10. A method for generating hardware device input, comprising:
- monitoring a touch-enabled display for an input device trigger;
- detecting the input device trigger from the touch-enabled display;
- sending a message to an operating system that the touch-enabled display is detached in response to detecting the input device trigger from the touch-enabled display;
- displaying, via a user interface, a virtual input device on the touch-enabled display in response to detecting the input device trigger from the touch-enabled display, wherein the user interface is to receive a start request from an emulator and send a request to a graphics driver to display the virtual input device;
- intercepting touch data from the virtual input device;
- generating hardware input based on the received touch data; and
- sending the generated hardware input to the operating system.

11. The method of claim 10, comprising detecting an adjustment gesture and adjusting the virtual input device based on the adjustment gesture.

12. The method of claim 10, comprising detecting an absence of the input device trigger and disabling the virtual input device in response to detecting the absence of the input device trigger.

13. The method of claim 10, comprising detecting an exit trigger and disabling the virtual input device in response to detecting the exit trigger.

14. The method of claim 10, comprising:
- receiving touch data from the virtual input device;
- generating private device data based on the received touch data; and
- sending the private device data to the virtual input device to provide feedback.

15. The method of claim 10, comprising displaying a user-draggable control on the touch-enabled display and moving the virtual input device to a new location based on touch data received at the user-draggable control.

16. The method of claim 10, comprising monitoring the touch-enabled display for additional gestures and disabling the virtual input device in response to detecting an exit gesture.

17. The method of claim 10, comprising disabling the virtual input device in response to detecting a predefined placement of the touch-enabled display.

18. At least one computer readable medium for generating hardware input data having instructions stored therein that, in response to being executed on a computing device, cause the computing device to:
- detect an input device trigger from one of two coupled touch-enabled displays;
- intercept touch data from a triggered touch-enabled display;
- send a message to an operating system that the touch-enabled display is detached in response to detecting the input device trigger from the touch-enabled display;
- display a virtual input device on the triggered touch-enabled display, wherein the instructions cause the computing device to receive a start request and send a request to a graphics driver to display the virtual input device;
- generate hardware input data based on the intercepted touch data; and
- send the hardware input data to an operating system.

19. The at least one computer readable medium of claim 18, wherein the graphics driver is to detach a display of the triggered touch-enabled display from the operating system in response to receiving the start input device request.

20. The at least one computer readable medium of claim 18, comprising instructions to generate private device data based on the intercepted touch data and send the private device data to the virtual input device to display feedback.

21. The at least one computer readable medium of claim 18, comprising instructions to disable the virtual input device in response to detecting an exit trigger.

* * * * *